Feb. 6, 1945.   R. R. WALTON   2,368,624
PACKAGE FILLING MACHINE
Filed March 27, 1942   2 Sheets-Sheet 1

INVENTOR
RICHARD R. WALTON
BY
Theodore C. Browne
HIS ATTORNEY

Feb. 6, 1945. R. R. WALTON 2,368,624
PACKAGE FILLING MACHINE
Filed March 27, 1942 2 Sheets-Sheet 2

INVENTOR
RICHARD R. WALTON
BY Theodore C. Browne
HIS ATTORNEY.

UNITED STATES PATENT OFFICE 2,368,624

PACKAGE FILLING MACHINE

Richard R. Walton, Cambridge, Mass., assignor of one-half to Container Corporation of America, Chicago, Ill., a corporation of Delaware, and one-half to Dewey and Almy Chemical Company, Cambridge, Mass., a corporation of Massachusetts Application March 27, 1942, Serial No. 436,410

6 Claims. (Cl. 226—58)

This invention relates to a bulk package filling device which is particularly useful in loading loose foods such as cherries, blueberries, etc., into lined airtight containers and is particularly adapted to the loading of loose frozen foodstuffs such as peas and lima beans.

The objects of the invention are to speed the loading operation and reduce its cost by avoiding stoppages at the loading station caused by the sticking of valves, slides or loading trips which previously have been used.

Cranberries, cherries, sliced peaches, strawberries and other small fruits are now bulk packaged before freezing in a container consisting of a carton made either from corrugated board or from waterproof millboard, which is provided with a flexible and extensible bag lining of vapor-proof rubber latex or a latex-like composition. The containers are also widely used for the packaging, after freezing, of loose frozen peas, lima beans, etc. Such large packages rarely enter retail trade, but are used by bakers, confectioners, ice cream manufacturers and fountain syrup makers and, in the case of frozen vegetables, by large restaurants and hotels.

A number of fruits (notably sliced peaches) oxidize badly when exposed, even for a short time, to air and it is therefore necessary to remove the air in these packages. In previous practice, some sort of an air lock which permits the removal of air after the container has been filled has always been necessary. Usually, this has consisted of a slide in the filling neck of the loading hopper which is closed after the bag has been filled and a valve which opens the line to the vacuum pump. In operating such a device, one must snap the neck of the bag around the filling neck of the loading hopper and pour the fruits or vegetables into the hopper whence they fall into the container. The slide must then be closed. The valve in the vacuum line must then be opened and the air in the bag and below the slide pumped out. These operations are time consuming and in practice erratic, since bits of fruit, ice crystals and sugar cause the slide to stick and any small pieces sucked into the vacuum line plug the vacuum valve.

In the present apparatus, there are no valves whatever and no slide is needed to shut off the air from entering the mouth of the bag during the exhausting step. As a result, loading is greatly expedited. The operator has nothing to attend to except the actual loading of the packages and no interruptions occur in operation.

Figure 1:
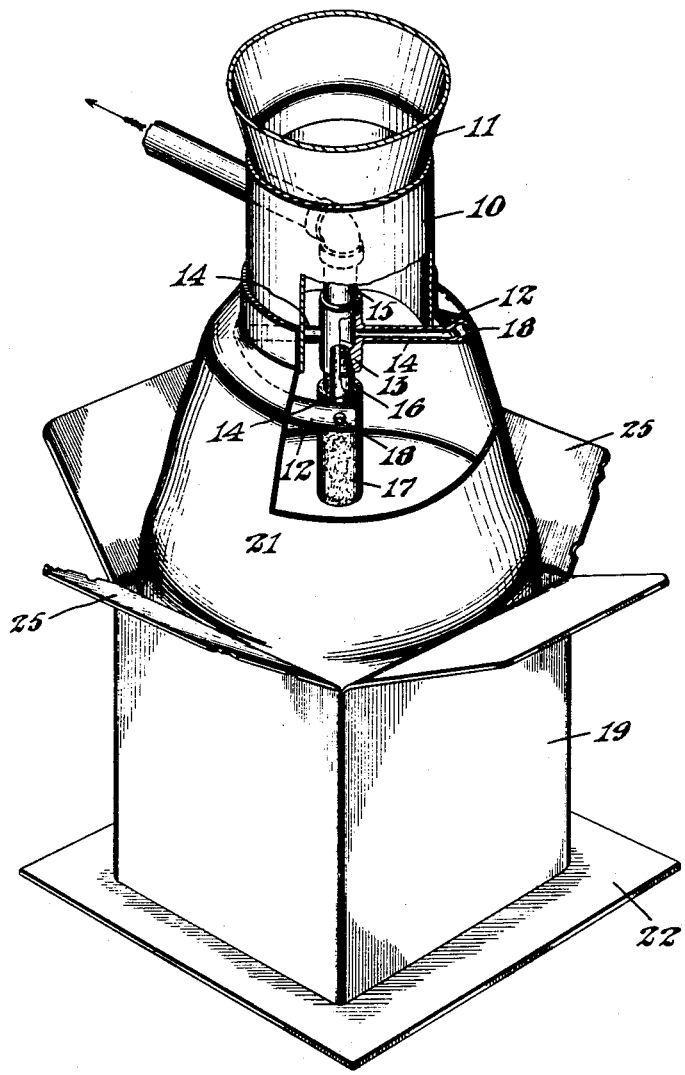
Figure 1 is a perspective view of the device, partly broken away.
Figures 4, 5:
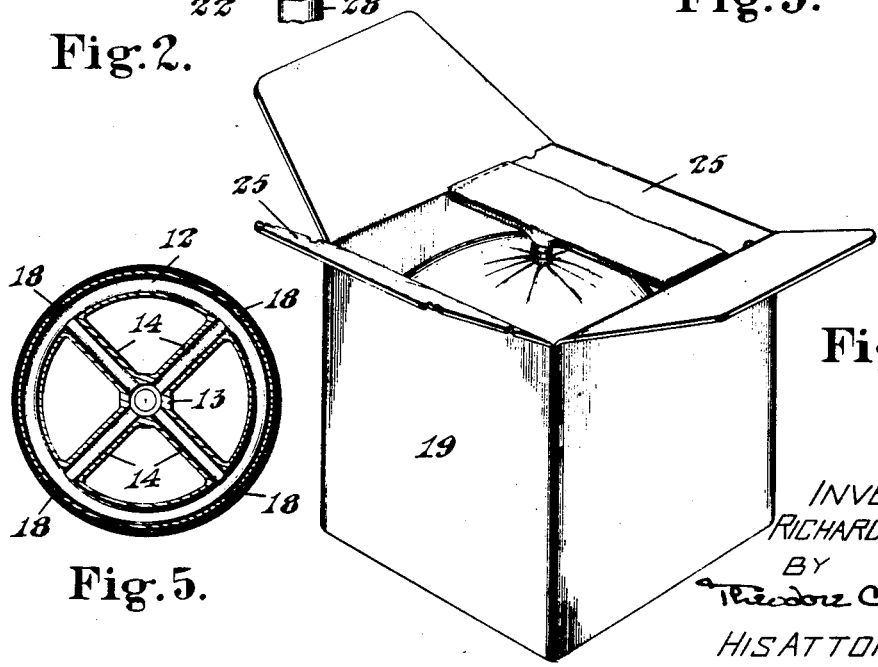
Figure 4 is a perspective view of the completed, filled package.
Figure 5 is a horizontal section through the evacuating ring taken on line 5—5 of Figure 2.

In carrying out the invention, I surround the cylindrical neck or spout 10 of the loading hopper 11 (the hopper itself has been cut away and is not shown) with a cored metal ring or pipe 12 which is connected to a cross or hub 13 axially mounted on the spout 10 by four small pipes 14. The air exhaust pipe 15 is connected to the upper vertical opening of the cross 13 while a short nipple 16 to which is attached a short length of very flexible rubber hose 17 is screwed in the lower opening. Four holes 18 are drilled in the ring 12 opposite the pipes and in line with their bores, as shown in Figures 1 and 5. I may drill other holes in the outer circumference of the ring if necessary. The air pipe 15 (Figure 1) is connected to a vacuum pump, preferably through a suitable trap (not shown) which prevents bits of foodstuff being sucked into the pump. The pump runs continuously while packages are being loaded.

The operation of the device is as follows: Assume that 50 pounds of frozen lima beans are to be loaded into the container 19. The operator snaps the open end of the extensible bag 21 about the filling spout 10 in such a manner that it covers the ring 12. During this operation inlets 18 and pipes 14 act to bleed air from atmosphere into cross 13 and thus reduce the volume of air flowing into the nozzle 17. If a large volume of air was not at this time passing through the holes 18 in the ring 12 application of the bag would prove a difficult task, for the bag is very thin and otherwise would be drawn against the rubber evacuating nozzle 17. With air entering the holes around the ring, suction at the evacuating nozzle is never sufficient to suck over or grab the bag, but the moment the bag occupies the position shown in Figure 1 it acts as a valve and seals off all air which enters the holes 18.

Figures 2, 3:
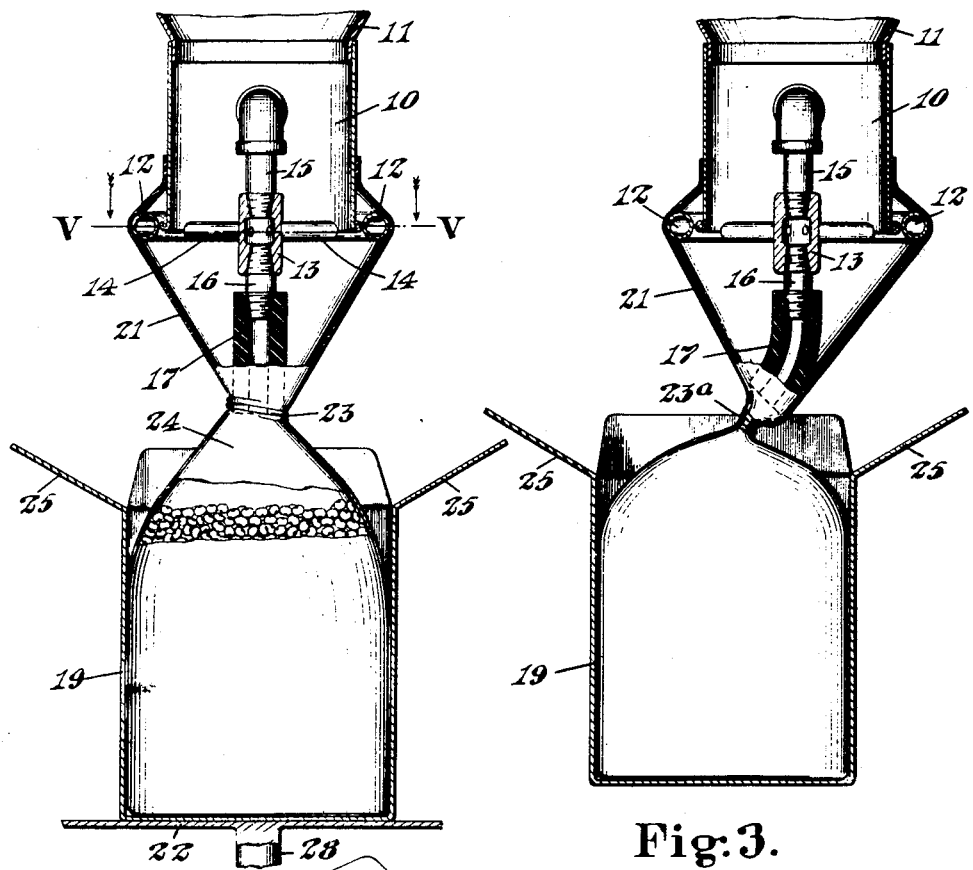
Figure 2 is a vertical sectional view through the loading device and container in which portions are shown in elevation for greater clarity.
Figure 3 is similar to Figure 2 but shows a later step in the process of packaging the material.

The operator then pours the lima beans into the hopper 11 where they immediately fall into the lined container. Quite heavy packages may need a turn table which is indicated at 22 (Figure 2) and is rotatable about the axis of spindle 28. Ordinary packages can be moved easily without the table. The operator then twists the loaded container through 180° forming a half twist 23 in the neck portion 24 of the bag 21, as Figure 2 shows. At this point, the holes 18 begin to perform a second function. External air, pressing on the thin rubber of the bag 21 opposite the holes 18 (see Figure 5) anchors the neck of the bag so securely to the filling spout 10 that the bag is held positively even though the pull in twisting is severe. This half twist pulls the walls of the bag closely against the lower part of the rubber evacuating nozzle 17 and effectively shuts off all air which, when the bag occupies the position shown in Figure 1, is drawn down the filling spout and up into the evacuating nozzle. As a result, only the air enclosed within the bag below the twist 23 can be exhausted by the pump.

When the evacuation of the package is complete, the operator then twists the package through three or four complete revolutions. As the twist in the neck of the bag tightens, the soft rubber evacuating nozzle 17 is forced out of the constriction 23a (see Figure 3). Three or four complete turns form a dependable hermetic seal. The rubber nozzle 17 is not strictly necessary. If the liner is sufficiently stretchable, it will tighten below a rigid nozzle. The operator then frees the neck of the bag from the filling spout and snaps it over one of the flaps 25 of the carton, immobilizing the twisted seal and forming a permanent closure. The length of the nozzle is critical and must be chosen with regard to the diameter of the ring 12 (and consequently the diameter of the neck of the bag) and the amount of material to be loaded into the bag so that when the first 180° turn or twist is made, the twist will pull the bag closely against the nozzle but leave its end in free communication with the bag and contents. In other words, the length of the nozzle 17 must be correlated with the size and capacity load of the bag.

Loading large packages with this apparatus is thus easy, sure and speedy.

I claim:

1. Apparatus for evacuating flexible containers comprising an evacuating nozzle, a hollow ring surrounding the nozzle, connected thereto, and having a plurality of openings through its outer wall, and a pneumatic connection between the bore of the ring and the bore of the nozzle.

2. Apparatus for filling and evacuating flexible containers comprising a filling spout, an evacuating nozzle projecting from the open end of the spout, a hollow ring connected to the nozzle and located adjacent the discharge end of the spout in pneumatic communication with the nozzle and having a plurality of openings through its outer wall.

3. Apparatus for filling and evacuating flexible containers comprising a filling spout, an evacuating pipe disposed along the axis of the spout and having a flexible nozzle projecting from the discharge end of the spout, a hollow ring on the spout adjacent its discharge end and having a plurality of openings in its outer wall in pneumatic communication with the evacuating pipe, and a rotatable platform below the nozzle for supporting the containers.

4. Apparatus for filling and evacuating flexible containers comprising a filling spout, means for withdrawing air from a container, including an evacuating nozzle projecting from the discharge end of the spout to be in open communication with the container to be filled, a pneumatic member located outside of and adjacent to the spout, the spout and pneumatic member being adapted to receive the container in over-lying relation thereto in filling position, said member having an inlet through its outer wall which is open to atmosphere when no container is in filling position on the spout and closed to atmosphere when a container is on the spout, and an exhaust connection for said means and member.

5. Apparatus for filling and evacuating flexible containers comprising a filling spout, means for withdrawing air from a container, including an evacuating nozzle projecting from the discharge end of the spout to be in open communication with the container to be filled, a pneumatic member closely surrounding the spout, the spout and pneumatic member being adapted to receive the container in overlying relation thereto in filling position, said member having a plurality of inlets through its outer wall which are open to atmosphere when no container is in filling position on the spout and closed to atmosphere when a container is on the spout, and an exhaust connection for said means and member.

6. Apparatus for filling and evacuating flexible containers comprising a filling spout, an evacuating nozzle mounted on said spout and in open communication with the container to be filled, and a bleeder conduit to the nozzle located on the outer surface of the spout at its open end, the spout and pneumatic member being adapted to receive the container in overlying relation thereto in filling position, said bleeder conduit having an inlet which is open to atmosphere when no bag is in position on the spout and conduit and closed to atmosphere when a bag is on the spout, and an exhaust connection for said nozzle and conduit.

RICHARD R. WALTON.